United States Patent [19]

Wallace

[11] Patent Number: 4,552,368
[45] Date of Patent: Nov. 12, 1985

[54] BACKUP SEAL WITH BUSH IN FORM OF RADIALLY FLOATING WASHER

[75] Inventor: Neil M. Wallace, Stockport, England

[73] Assignee: Flexibox Limited, Manchester, England

[21] Appl. No.: 676,857

[22] Filed: Nov. 30, 1984

[30] Foreign Application Priority Data

Dec. 1, 1983 [GB] United Kingdom ............... 8332074

[51] Int. Cl.$^4$ ............................................. F16J 15/38
[52] U.S. Cl. ..................................... 277/27; 277/28; 277/65; 277/83; 277/85; 277/174
[58] Field of Search ................. 277/3, 27, 28, 58, 59, 277/65, 81 R, 82, 83, 85, 173, 176, 177

[56] References Cited

U.S. PATENT DOCUMENTS

| | | | |
|---|---|---|---|
| 3,090,627 | 5/1963 | Tankus | 277/65 X |
| 3,144,253 | 8/1964 | Schirmer | 277/27 |
| 3,291,491 | 12/1966 | Smith | 277/3 X |
| 3,811,687 | 5/1974 | Honold et al. | 277/28 |
| 4,204,689 | 5/1980 | Johansson | 277/59 X |

FOREIGN PATENT DOCUMENTS

| | | |
|---|---|---|
| 2659880 | 2/1978 | Fed. Rep. of Germany . |
| 2844945 | 4/1980 | Fed. Rep. of Germany . |
| 941141 | 11/1963 | United Kingdom ............... 277/27 |

*Primary Examiner*—Robert S. Ward
*Attorney, Agent, or Firm*—Bacon & Thomas

[57] ABSTRACT

A backup seal for a main seal (not shown) sealing a rotary shaft (10) to a housing (12) comprises a rotary seal element (20) sealed (22) to the shaft (10) and a stationary seal element (16) sealed (18) to the housing (12). The seal elements (16,20) have opposing annular seal surfaces (41,42) surrounding the shaft (10) and these are adapted to be urged together to form a running seal therebetween substantially only by the pressure of fluid product leaking through the main seal should that fail. A second aspect of the invention provides a close fit bush (50) which helps to close the seal faces (41,42) together when the main seal fails and before any leak occurs between them.

14 Claims, 4 Drawing Figures

4,552,368

BACKUP SEAL WITH BUSH IN FORM OF RADIALLY FLOATING WASHER

TECHNICAL FIELD

This invention relates to mechanical seals employed to seal a rotary shaft exiting a housing containing fluid to be retained within the housing or more particularly to back-up seals for such mechanical seals.

Mechanical seals are usually required for instance, in pumps or the like where high fluid pressures may subsist in the pump housing and the input shaft for the pump must be sealed to the housing.

BACKGROUND ART

Mechanical seals suitable for this purpose may comprise a stationary seal element sealed in the housing and a rotary seal element sealed on the shaft, each seal element being provided with opposing annular seal faces surrounding the shaft and urged against one another to form a running seal.

Nevertheless, what ever type of seal is employed it is desirable in some cases to provide a backup seal in the event that the main seal should fail. This is the case where volatile, toxic, flammable etc. fluid products are contained in the housing to be sealed.

A very satisfactory arrangement provides a backup seal comprising a seal of the same type as the main seal and mounted in tandem with the main seal in an extension of the housing. The space defined by the shaft, housing and two seals may be supplied with a circulating barrier fluid which serves several functions. Firstly the barrier fluid serves to cool and lubricate the seal faces and to remove impurities from the region. Secondly if the main seal should fail the increased pressure of the barrier fluid gives a warning of this fact and the barrier fluid serves to dilute and remove the leaking product.

Such a system suffers the disadvantage that it is expensive in terms of the extra equipment that must be provided. It has been suggested to run such tandem seals dry, that is, without a barrier fluid but this means that the backup seal receives no liquid lubrication and hence wears quickly. Thus it has also been suggested in, for instance, German published patent application No. 2659880 (Flexibox) to provide a backup seal comprising a stationary seal element sealed in the housing and a rotary seal element sealed on the shaft, each seal element being provided with opposing annular seal faces surrounding the shaft and being adapted to be urged toward one another to form a running seal therebetween substantially only by the pressure of fluid product leaking past the main seal should that seal fail.

Thus while there is no leak past the main seal there is no significant pressure urging the seal faces together and hence they do not wear. If the main seal should fail however then the increased fluid pressure now acting on the seal elements is arranged to close the seal elements together to form the secondary seal and prevent the product from leaking.

In such an arrangement however it is often found that before the hydraulic pressure can close the seal a quantity of the product leaks through the seal and if the product is particularly toxic, flammable etc then this temporary leak may be unacceptable.

German published patent application No. 2844945 (Burgmann) suggests the provision of a bush on the stationary seal element around the shaft. Should the main seal be broken the fluid product must leak past the bush before it can leak between the seal faces. However because the bush is a relatively close fit on the shaft, the pressure builds up behind the bush and tends to close the seal elements together before significant leakage past the bush occurs and certainly before any appreciable leakage through the seal element begins.

However, because the bush is fixed in the housing it cannot have a fine clearance on the shaft because of the danger of shaft pickup. Thus to get an adequate pressure drop along it the bush must be long. Moreover although a large hydraulic force is initially desirable to close the seal elements together quickly, once they are closed such a large force is not desirable at all because the seal faces would wear too rapidly.

SUMMARY OF THE INVENTION

Thus the present invention employs a bush in the form of an axially free radially floating washer which is a close fit on the shaft. Because the washer is radially floating it can be a very much closer fit than has hitherto been possible and thus it need not be as long in order to achieve an adequate pressure drop across it.

Moreover means is also provided enabling the fluid pressure on either side of the bush to be equalised after a period and this is achieved by scollops formed in that surface of the washer which is the close fit on the shaft. In another embodiment this is achieved by splitting the washer. By equalising the pressure and careful positioning of the seal faces and the means sealing the seal elements to their respective mountings in the housing and on the shaft, the dynamic balance of the seal can be optimised for maximum efficiency and minimum wear of the seal.

In another embodiment the bush is in the form of an axially free radially floating washer which is a close fit in the housing and the backup seal has the rotary seal element adjacent the main seal as opposed to the stationary seal element in the embodiments referred to above.

The invention is further described with reference to the accompanying drawings in which.

Figure 1:
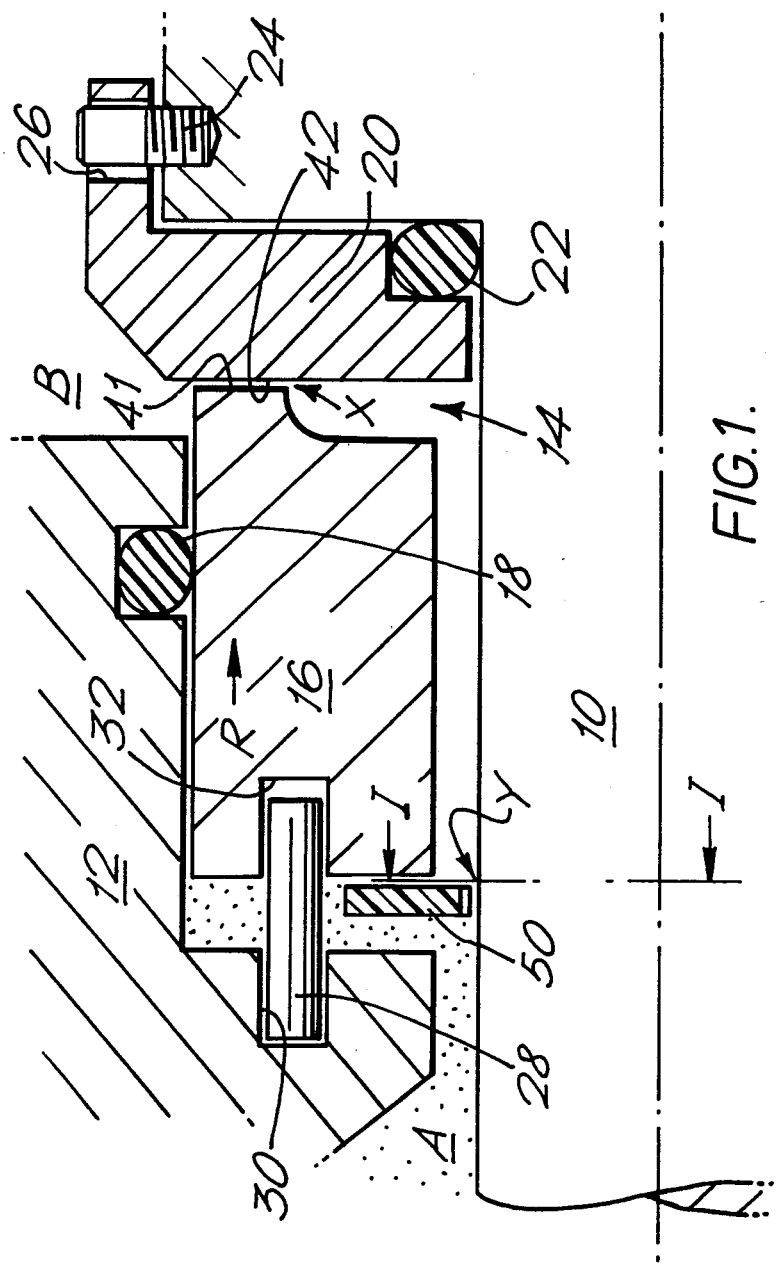
FIG. 1 is a section through a backup seal according to the present invention.

In FIG. 1 a shaft 10 passes through a housing 12 and is sealed with respect thereto by a main mechanical seal (not shown) disposed on the shaft and in the housing to the left of the drawing. In the drawing a backup seal 14 prevents fluid product which may leak through the main mechanical seal into region A escaping to the environment at B.

The backup seal 14 comprises a stationary seal element 16 sealed in the housing 12 by an O-ring 18 and a rotary seal element 20 sealed on the shaft 10 by an O-ring 22.

The rotary seal element 20 is constrained to rotate with the shaft 10 by a pin 24 secured in the shaft and engaging a slot 26 in the seal element 20. Similarly, the stationary seal element 16 is prevented from rotating with the shaft 10 by a pin 28 which engages a bore 30 formed in the housing 12 and a bore 32 formed in the seal element 16. Should fluid product under pressure leak past the main mechanical seal (not shown) into the area A it will attempt to escape between the inside diameter of the stationary seal element 16 and the shaft 10 and thence between opposing seal faces 41 and 42 of the seal elements 16, and 20 respectively.

In so doing a pressure drop is created along the faces 41,42 such that there is a net force on the stationary seal element 16 in the direction of the arrow R in the drawing. This force is dependent on the back pressure created and the diameter of the face 41 relative to the outside diameter of the seal element 16. The back pressure created is dependent on the size of gap X between the faces 41, 42.

If the gap X between the two faces is large the leakage flow rate through the gap X may be unacceptably high before the seal element 16 moves in the direction of the arrow R and thus closes the gap X.

The positioning of the face 41 with respect to the outside diameter of the seal element 16 is governed by the desired closing force on the seal element 16 during operation of the seal 14. This should be sufficient to prevent significant leakage between the faces 41, 42 but should not be so great that there is no fluid film between the faces 41,42. In that event substantial wear of the faces would take place such that the backup seal 14 might not survive the time required to shut down the plant for the replacement or repair of the main seal.

However, at the point of balance between these two extremes it is found that there is sometimes significant product leakage through the gap X between the faces 41,42 before that gap closes. Moreover various factors including the need to accomodate components tolerance build-up and thermal expansion dictate that gap X shall be large and product leakage high.

This may not be a problem in certain applications but where the product is particularly dangerous even that may be unacceptable.

Thus the invention provides a washer or bush 50 between the seal element 16 and the main seal (not shown). The bush is retained within the gap between the back of the seal element 16 and the housing 12.

Thus should the main seal leak and fluid pressure build up in the region A the bush 50, which is a close sliding fit on the shaft 10 with perhaps about 0.005″ (0.13 mm) diametral clearance, is pushed against the back of the seal element 16. Initially a pressure differential exists across the gap Y between the bush 50 and the shaft 10. Thus the net closing force on the seal element 16 in the direction of the Arrow R is now dependent on the difference between the squares of the outer diameter of the seal element 16 and the diameter of the shaft 10. This is clearly a much greater closing force than described above and hence the seal 14 closes quickly.

The bush 50 allows some leak through the gap Y and/or is provided with scollops 52 to increase the leak so that in spite of the fact that the seal 14 closes quickly as fluid pressure builds up in region A, the pressure differential along the gap Y soon drops and appears instead along the gap X. Thus the normal running closing force on the seal element 16 soon returns to the same value as determined above where the bush 50 is not present.

With no leak across the main seal, of course, the pressure in the region A is virtually atmospheric and hence there is no resultant force on the seal element 16.

Thus there is no or very little wear on the seal faces 41, 42 and hence the advantages of running a dry backup seal can be realised.

The washer or bush 50 not only serves the function described above but also serves to keep solids away from the seal faces 41, 42, firstly by virtue of its close fit on the shaft and secondly by its operation as a flinger when it occasionally rotates with the shaft.

Figure 1A:
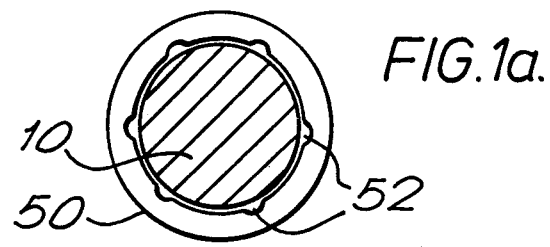
FIG. 1a is a detail along the line I—I in FIG. 1.
Figure 2:
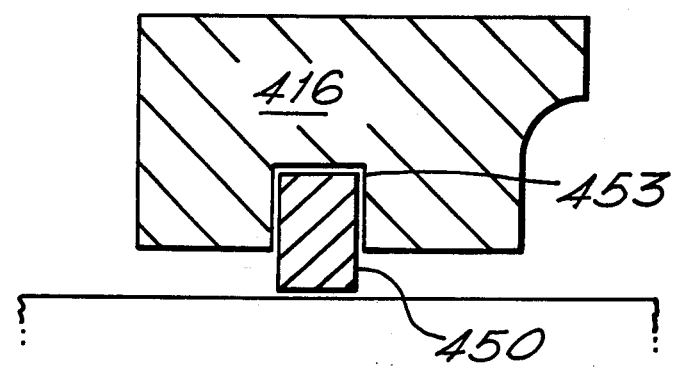
FIG. 2 shows a different embodiment of a washer according to the invention; and, FIG. 3 is a section through another backup seal also according to the invention.

FIG. 2 shows a variation in the nature of the washer 450 is free but is captivated in a groove 453 formed in the seal element 416. The washer may be split and constructed from a resiliently deformable material such as rubber or PTFE to aid assembly. The split may be such that a significant gap Y as in FIG. 1 or scollops 52 as in FIG. 1a are unnecessary. The bush 50 may likewise be constructed from PTFE or rubber.

Moreover, although no springs or other urging means are shown, either to urge the bush into contact with the seal element 16 or lightly to hold the seal element 16 in contact with the element 20 (or indeed out of contact therewith) during normal operation of the main seal, the provision of such means is not precluded by the present invention if such is considered desirable in particular cases.

Figure 3:
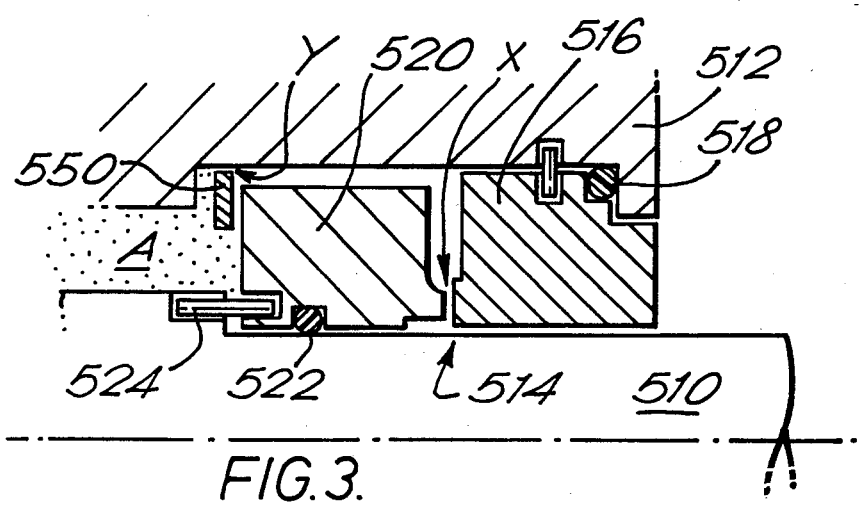

Finally, while the embodiment shown in FIG. 1, or as modified in respect of FIG. 2 is preferred, it is feasible to operate the invention as illustrated in FIG. 3 wherein the rotary seal element 520 is nearest to the main seal (not shown) and hence is acted upon by fluid pressure in the region A. In this case the washer or bush 550 is a close fit in the housing 512. The seal 514 otherwise operates in the same way as the seal 14 described with reference to FIG. 1.

What is claimed is:

1. A mechanical seal system for a rotary shaft exiting a housing containing fluid to be retained within the housing, the system comprising:
   (a) a main mechanical seal; and
   (b) a second, backup seal having:
      (i) a stationary seal element sealed in the housing;
      (ii) a rotary seal element sealed on the shaft, each seal element being provided with opposing annular seal faces surrounding the shaft and being arranged to be urged toward one another to form a running seal therebetween substantially only by the pressure of any fluid product leaking past the main seal should that seal fail; and,
      (iii) a bush in the form of an axially free, radially floating washer disposed on the shaft between the main and backup seals, which bush is a close fit on the shaft and is adapated to form a temporary seal between the shaft and stationary seal element while fluid pressure behind the washer and seal element builds up and closes the backup seal between the rotary and stationary seal elements.

2. A mechanical seal system as claimed in claim 1 in which said close fit bush is provided with means allowing equalisation of pressure on either side of said bush after a delay.

3. A mechanical seal system as claimed in claim 2 in which said means is a plurality of scollops formed in that surface of the washer which is the close fit on the shaft.

4. A mechanical seal system as claimed in claim 1 in which said washer is captivated in a groove formed in the stationary seal element.

5. A mechanical seal system as claimed in claim 4 in which said washer is split and is constructed from resiliently deformable material to aid assembly in said groove.

6. A mechanical seal system as claimed in claim 5 in which means allowing equalisation of pressure on either side of said bush after a delay is provided by the gap formed by said split in the bush.

7. A mechanical seal system as claimed in claim 1 in which said washer is constructed from PTFE or rubber.

8. A mechanical seal system for a rotary shaft exiting a housing containing fluid to be retained within the housing, the system comprising:
 (a) a main mechanical seal; and,
 (b) a second, backup seal having:
   (i) a stationary seal element sealed in the housing;
   (ii) a rotary seal element sealed on the shaft, each seal element being provided with opposing annular seal faces surrounding the shaft and being arranged to be urged toward one another to form a running seal therebetween substantially only by the pressure of any fluid product leaking past the main seal should that seal fail; and,
   (iii) a bush in the form of an axially free, radially floating washer disposed in the housing between the main and backup seals, which bush is a close fit in the housing and is adapted to form a temporary seal between the housing and rotary seal element while fluid pressure behind the washer and seal element builds up and closes the gap between the rotary and stationary seal elements.

9. A mechanical seal system as claimed in claim 8 in which said close fit bush is provided with means allowing equalisation of pressure on either side of said bush after a delay.

10. A mechanical seal system as claimed in claim 9 in which said means is a plurality of scollops formed in that surface of the washer which is the close fit in the housing.

11. A mechanical seal system as claimed in claim 8 in which said washer is captivated in a groove formed on the seal element.

12. A mechanical seal system as claimed in claim 11 in which said washer is split and is constructed from resiliently deformable material to aid assembly in said groove.

13. A mechanical seal system as claimed in claim 12 in which means allowing equalisation of pressure on either side of said bush after a delay is provided by the gap formed by said split in the bush.

14. A mechanical seal system as claimed in claim 8 in which said washer is constructed from PTFE or rubber.

* * * * *